United States Patent [19]

Ishikawa et al.

[11] Patent Number: 5,434,643
[45] Date of Patent: Jul. 18, 1995

[54] IMAGE PRINTER HAVING PROJECTION EXPOSURE MEANS

[75] Inventors: Masazumi Ishikawa; Toru Tanibata, both of Wakayama, Japan

[73] Assignee: Noritsu Koki Co., Ltd., Wakayama, Japan

[21] Appl. No.: 255,628

[22] Filed: Jun. 9, 1994

[30] Foreign Application Priority Data

Jun. 14, 1993 [JP] Japan .................. 5-141626

[51] Int. Cl.$^6$ .................. G03B 27/33; G03B 27/52
[52] U.S. Cl. .................. 355/27; 355/32
[58] Field of Search .................. 355/27, 28, 32

[56] References Cited

U.S. PATENT DOCUMENTS

| 4,774,547 | 9/1988 | Uchida et al. | 355/27 |
| 4,791,456 | 12/1988 | Hope et al. | 355/28 |
| 4,872,033 | 10/1989 | Watanabe et al. | 355/27 |

*Primary Examiner*—Richard A. Wintercorn
*Attorney, Agent, or Firm*—Townsend and Townsend Khourie and Crew

[57] ABSTRACT

An image printer includes a transport device for transporting standard and auxiliary photosensitive materials to a developing unit, an exposure system for exposing the photosensitive materials. The transport device includes a standard transport unit and an auxiliary transport unit. The standard transport means transports to the developing unit the standard photosensitive material having sensitivity to a wavelength range of the three primary color components of light. The auxiliary transport unit transports to the developing unit the auxiliary photosensitive material having sensitivity to a light wavelength range different from that of the standard photosensitive material. The exposure system includes a standard exposure unit and an auxiliary exposure unit. The standard exposure unit exposes the standard photosensitive material at an exposing position of the standard transport unit, while the auxiliary exposure unit exposes the auxiliary photosensitive material at an exposing position of the auxiliary transport unit.

10 Claims, 4 Drawing Sheets

IMAGE PRINTER HAVING PROJECTION EXPOSURE MEANS

BACKGROUND OF THE INVENTION

1. Field of the Invention

The present invention relates to an image printer, and more particularly to an image printer having projection exposure means.

2. Description of the Related Art

As an image printer for exposing a film image onto a photosensitive material, there is well-known e.g. an image printer including a projection exposure unit for projecting and exposing a film image onto a photosensitive material and a developing unit for developing the photosensitive material which has been exposed at the projection exposure unit.

The image printer of the above-described type further includes transport means for transporting the photosensitive material via an exposing position of the projection exposure unit to the developing unit. Then, while being transported by this transport means, the photosensitive material undergoes a series of operations from the exposure of the film image to the developing operation, so that the exposure of the film image onto the photosensitive material may be carried out in a convenient manner.

Incidentally, the photosensitive material processed by the above-described image printer is adapted so as to have sensitivity to a wavelength range of the three primary color components, i.e. red, blue and green thereby to cover the entire wavelength range of the visible light. Further, an exposure light source for exposing the photosensitive material having the above-described characteristics too is constructed so as to irradiate white light beam having the wavelength range of the respective three primary color components of red, green and blue.

On the other hand, as an exposure light source, besides the above-described white light source, there is also available a semiconductor light emitting element light source such as a semiconductor laser or a light emitting diode. These semiconductor light emitting element light source is capable of an exposure operation in the unit of pixel, so that this light source may be used also for a so-called digital processing of image information. Further, due to its small light-emitting spot diameter, this type of light source is known to be capable of achieving a higher resolution.

In spite of the above, as the semiconductor light emitting light source, there has been developed one for irradiating red beam or infrared beam. However, there has not yet been developed one capable of obtaining a sufficient light amount in the wavelength range of the blue component. Accordingly, it has been impossible to employ such light source as an exposure light source for the photosensitive materials employed in the conventional image printer of the above-described type.

As far as the exposure of a film image onto a photosensitive material is concerned, the above-described conventional photosensitive material can do in most cases. Still, it has been desired to use also a light source of the above-described type which is not capable of covering the entire wavelength range of the visible light. In this respect, there has been room for improvement.

The present invention attends to the above-described state of the art. A primary object of the present invention is to provide an image printer which allows use of the conventional photosensitive material having sensitivity to the wavelength range of the respective three primary color components and which also allows use, as an exposure light source, a light source incapable of covering the entire wavelength range of the visible light.

SUMMARY OF THE INVENTION

For accomplishing the above-noted object, an image printer, according to the present invention, comprises:

transport means for transporting standard and auxiliary photosensitive materials to a developing unit;

exposure means for exposing the photosensitive materials;

wherein, said transport means includes standard transport means and auxiliary transport means, said standard transport means being operable to transport to said developing unit said standard photosensitive material having sensitivity to a wavelength range of the three primary color components of light, said auxiliary transport means being operable to transport to said developing unit said auxiliary photosensitive material having sensitivity to a light wavelength range different from that of said standard photosensitive material; and wherein, said exposure means includes standard exposure means and auxiliary exposure means, said standard exposure means being operable to expose said standard photosensitive material at an exposing position of said standard transport means, said auxiliary exposure means being operable to expose said auxiliary photosensitive material at an exposing position of said auxiliary transport means.

According to the above-described construction, the standard transport means transports, through the exposing position, the standard photosensitive material having sensitivity to the respective three primary color components of e.g. red, green and blue. Then, at the exposing position of this standard transport means, the standard exposure means exposes the standard photosensitive material. Thereafter, this standard photosensitive material which has been exposed at the exposing position is transported by the standard transport means to the developing unit to be developed thereby.

The auxiliary photosensitive material, as described above, has sensitivity to a different wavelength range of those of the standard photosensitive material, for instance, a wavelength shifted to the longer wavelength side relative to those of the latter. Then, it becomes possible to employ, as an exposure light source of this auxiliary exposure means, a light source which is not capable of irradiating a light beam of a shorter wavelength.

As a result, the printer may use not only the standard photosensitive material of a higher frequency of use, but also the auxiliary photosensitive material having a different wavelength range from that of the standard photosensitive material. Thus, the printer may use, as the exposure light source, such light source which is not capable of covering the entire wavelength range of the visible light.

According to one aspect of the present invention, at the developing unit, the standard or the auxiliary photosensitive material transported therein is transported in a single line to undergo the developing operation.

With this construction, the introduced standard or auxiliary photosensitive material is transported in a single line at the developing unit. For this, the developing unit may have a width, normal to the photosensitive material transporting direction, just sufficient to allow transport of either the standard or the auxiliary photosensitive material which has the wider width than the other.

Furthermore, comparing the frequencies of use between the standard photosensitive material and the auxiliary photosensitive material, that of the former is significantly higher than that of the latter. Accordingly, practically no reduction of processing capacity of the printer occurs due to the above-described one-line transportation construction for the photosensitive materials.

Consequently, it becomes possible to reduce the occupying space of the developing unit, thereby to contribute to size reduction of the entire printer, without reduction in its processing capacity.

According to a still further aspect of the invention, the auxiliary exposure means uses a semiconductor laser as an exposure light source thereof and the auxiliary photosensitive material has sensitivity to a wavelength of light emitted from said semiconductor laser.

With the above construction, at the exposing position of the auxiliary transport means, the auxiliary photosensitive material is exposed by the auxiliary exposure means using the semiconductor laser as its exposure light source.

As a result, with the use of the semiconductor laser as the exposure light source, a digital processing of the image information too becomes possible. Further, because of its small light-emitting spot diameter, image exposure of a higher resolution may be achieved.

According to a still further aspect of the present invention, the auxiliary exposure means includes three types of semiconductor lasers for respectively irradiating light beams of three different wavelength ranges.

With the above-described construction, the three types of semiconductor lasers provided to the auxiliary exposure means as its exposure light sources respectively irradiate light beams of three different wavelength ranges to expose the auxiliary photosensitive material.

Then, if the wavelength range for which the auxiliary photosensitive material has its sensitivity is set to to the light beams of the three kinds of wavelengths emitted from the three types of the semiconductor lasers and if this auxiliary photosensitive material is adapted to develop the three color components for the light beams of the three wavelength ranges, a full-color development of this photosensitive material becomes possible as well.

According to a still further aspect of the invention, the auxiliary exposure means uses a light emitting diode as an exposure light source thereof and the auxiliary photosensitive material has sensitivity to a wavelength of light emitted from said light emitting diode.

With the above construction, at the exposing position of the auxiliary transport means, the auxiliary photosensitive material is exposed by the auxiliary exposure means using the light emitting diode as its exposure light source.

As a result, with the use of the light emitting diode as the exposure light source, a digital processing of the image information too becomes possible. Further, because of its small light-emitting spot diameter, image exposure of a higher resolution may be achieved.

According to a still further aspect of the present invention, the auxiliary exposure means includes three types of light emitting diodes for respectively irradiating light beams of three different wavelength ranges.

With the above-described construction, the three types of light emitting diodes provided to the auxiliary exposure means as its exposure light sources respectively irradiate light beams of three different wavelength ranges to expose the auxiliary photosensitive material.

Then, if the wavelength range for which the auxiliary photosensitive material has its sensitivity is set to to the light beams of the three kinds of wavelengths emitted from the three types of the light emitting diodes and if this auxiliary photosensitive material is adapted to develop the three color components for the light beams of the three wavelength ranges, a full-color development of this photosensitive material becomes possible as well.

Further and other objects, features and effects of the invention will become apparent from the following more detailed description of the embodiments of the invention with reference to the accompanying drawings.

DESCRIPTION OF THE PREFERRED EMBODIMENTS

Preferred embodiments of an image printer relating to the present invention will now be described in particular with reference to the accompanying drawings.

Figure 1:
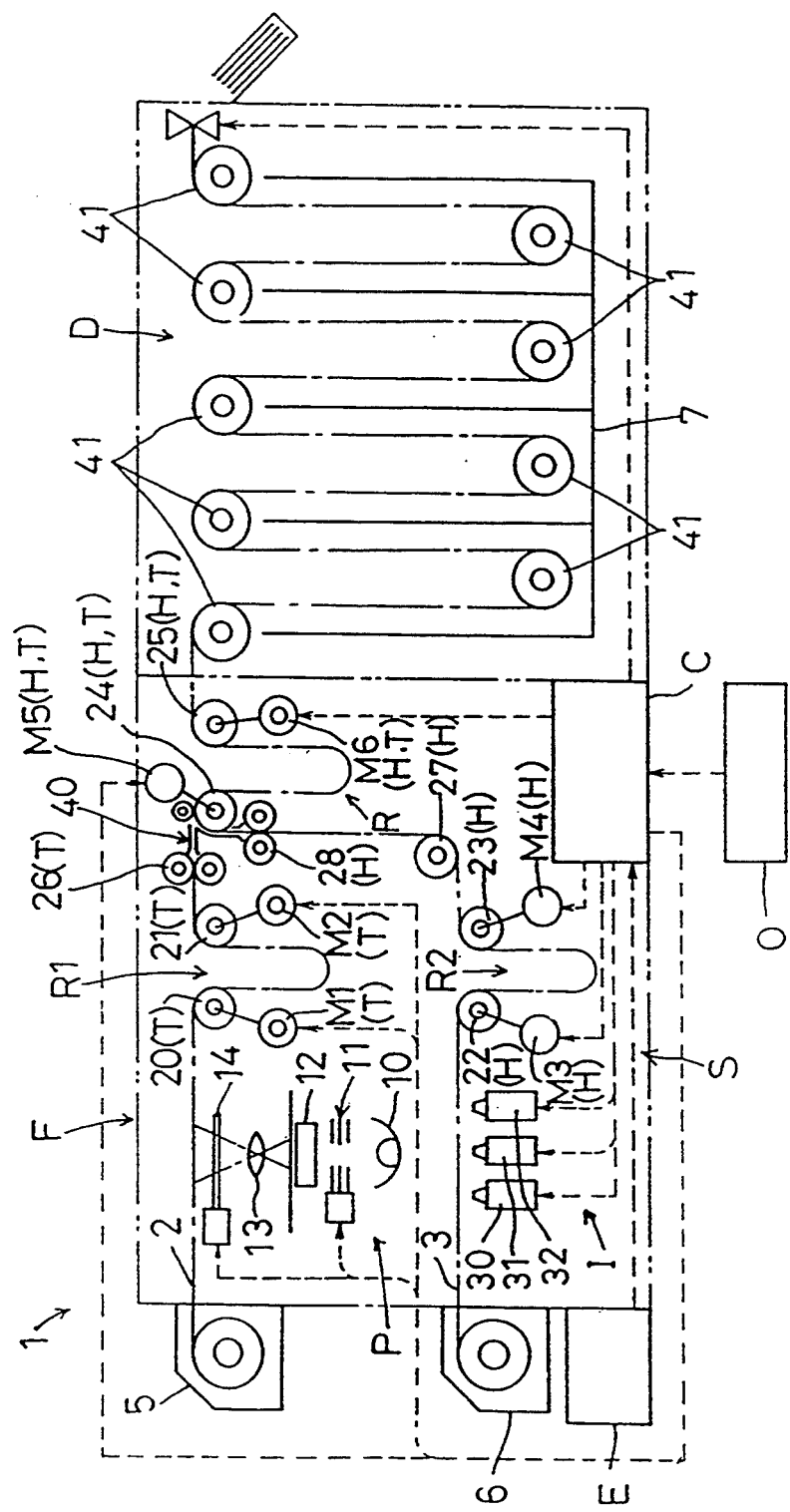
FIG. 1 is a schematic construction view of an image printer according to one preferred embodiment of the present invention.

As shown in FIG. 1, an image printer 1 includes, as main components thereof, a first exposure unit F, a second exposure unit S, a main loop forming unit R, a developing unit D, and a controller C for controlling these components of the image printer 1.

Figure 2:
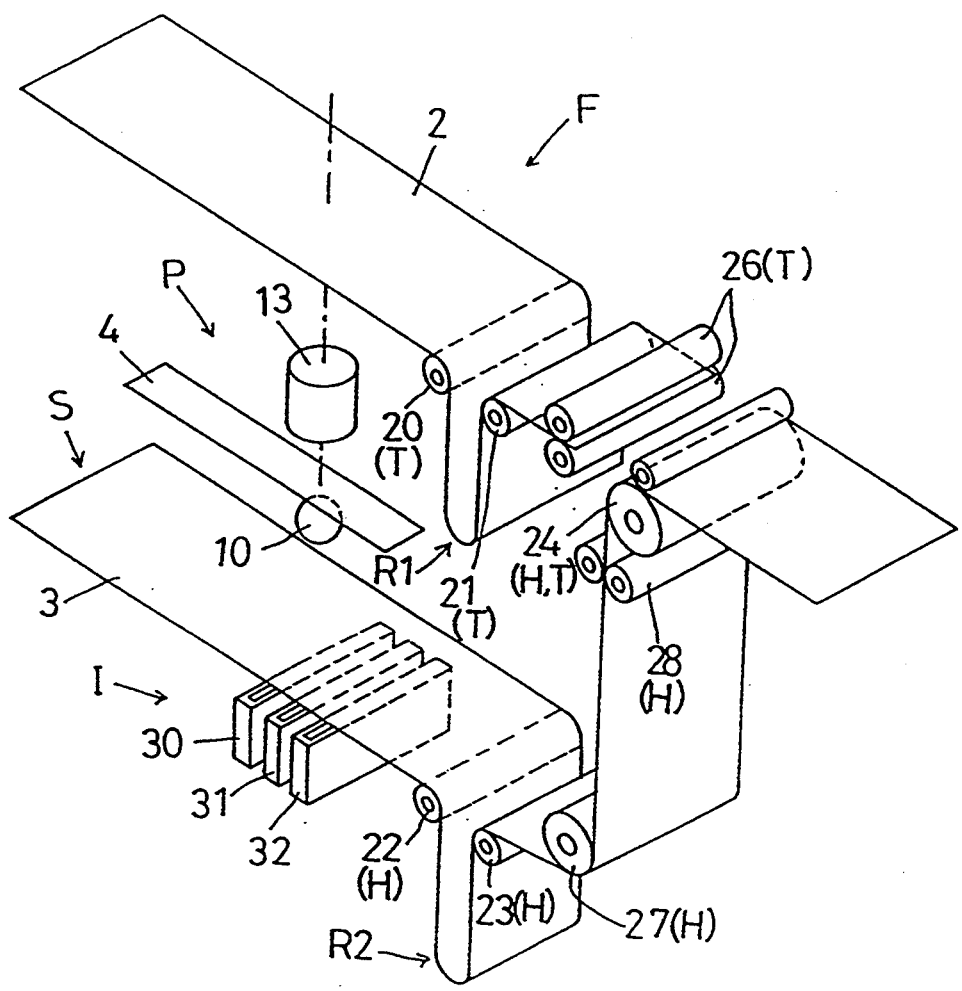
FIG. 2 is a perspective view showing major portions of the image printer of FIG. 1.

As shown in FIG. 2, the first exposure unit F and the second exposure unit S are disposed in parallel one above the other in the vertical direction. The first exposure unit F is adapted for exposing a standard printing paper 2 as a standard photosensitive material capable of developing colors of yellow, magenta and cyanogen by sensing light beams of the three color components of the light, i.e. red, green and blue, respectively. On the other hand, the second exposure unit S is adapted for exposing a sensitivity-shifted printing paper 3 as an auxiliary photosensitive material having sensitivity to a light wavelength range different from that of the standard photosensitive material. More particularly, the auxiliary photosensitive material is capable of developing the colors of yellow, magenta and cyanogen by sensing light beams of 600 nm wavelength, 750 nm wavelength and 830 nm wavelength, respectively. incidentally, in FIG. 2, for the purpose of facilitating its viewing, some of the above-mentioned components are eliminated from the view.

The first exposure unit F includes a projection exposure unit P for projecting and exposing an image of a film 2 on to the standard printing paper 2, and a first loop forming unit R1 for accumulating, in the form of a loop, the standard printing paper 2 which has been exposed at the projection exposure unit P.

The second exposure unit S includes an image exposure unit I for exposing image information as being divided into a number of areas and a second loop forming unit R2 for accumulating, in the form of a loop, the sensitivity-shifted printing paper 3.

Next, the respective components will be specifically described:

The projection exposure unit P of the first exposure unit F includes a white-light light source 10, a light modulating filter 11 for adjusting color balance of the light irradiated from the white-light light source 10, a mirror tunnel 12 for uniformly mixing the light passing the light modulating filter 11, a printing lens 13 for forming an image of a film 4 onto the standard printing paper 2, and a shutter 14, with all these components being disposed on a single optical path. An exposing position is formed where the image of the film 4 is formed by the printing lens 13.

The first loop forming unit R1 includes a roller 20, a motor M1 for rotatably driving the roller 20, a roller 21, and a motor M2 for rotatably driving the roller 21.

With rotation of the roller 20, the standard printing paper 2 is withdrawn from a first printing paper magazine 5 in which the standard printing paper 2 is stored in a rolled state and then is guided to the projection exposure unit P.

At the first loop forming unit R1, when an exposure operation of the standard printing paper 2 is to be continuously effected at the projection exposure unit P while the transportation of the standard printing paper 2 is stopped on the downstream side in the printing paper transport passage relative to the roller 21, the standard printing paper 2 is accumulated in the form of a loop.

The image exposure unit I of the second exposure unit S includes a first exposure head 30 using a semiconductor laser of 670 nm oscillating wavelength as its exposure light source, a second exposure head 31 using a semiconductor laser of 750 nm oscillating wavelength as its exposure light source, and a third exposure head 32 using a semiconductor laser of 830 nm oscillating wavelength as its exposure light source.

The first exposure head 30, the second exposure head 31 and the third exposure head 32 are responsible respectively for color developments of yellow, magenta and cyanogen in accordance with the afore-described characteristics of the sensitivity-shifted printing paper 3. Also, the exposure image information to be transmitted from the controller C to the respective exposure heads 30, 31, 32 is divided into image information resolved into the above-described respective color components.

The exposure heads 30, 31, 32 have a basically identical construction except for the differences in the oscillating wavelengths of the semiconductor lasers used as the exposure light sources. Though not shown, the irradiation beam of each semiconductor laser is scanned by a polygon mirror to be irradiated via e.g. f-O lens on to the sensitivity-shifted printing paper 3. Accordingly, exposing positions are formed where the respective exposure heads 30, 31, 32 face.

The scanning direction of the laser beam extends normal to the transporting direction of the printing paper. With one time of scanning, one-line amount of the image information divided into a plurality of lines is exposed. Then, as the one-line amount of transportation of the sensitivity-shifted printing paper 3 and that of the above-described scanning operation are repeatedly carried out, the two-dimensional image information is exposed.

The second loop forming unit R2 includes a roller 22, a motor M3 for rotatably driving the roller 22, a roller 23, and a motor M4 for rotatably driving the roller 23.

With rotation of the roller 22, the sensitivity-shifted printing paper 3 is withdrawn from a second printing paper magazine 6 in which the sensitivity-shifted printing paper 3 is stored in a rolled state and then is guided to the image exposure unit I.

At the second loop forming unit R2, when an exposure operation of the sensitivity-shifted printing paper 3 is to be continuously effected at the image exposure unit I while the transportation of the sensitivity-shifted printing paper 3 is stopped on the downstream side in the printing paper transport passage relative to the roller 23, the sensitivity-shifted printing paper 3 is accumulated in the form of a loop.

The main loop forming unit R includes a roller 24, a motor M5 for rotatably driving the roller 24, a roller 25, and a motor M6 for rotatably driving the roller 25.

The main loop forming unit R is operable to absorb difference between the transporting speed of the printing paper at the developing unit D and the transporting speed of the printing paper on the upstream side in the printing paper transport passage relative to the roller 24.

The roller 24 of the main loop forming unit R and the roller 21 of the first, loop forming unit R1 are operatively connected to each other through an unillustrated belt interposed therebetween. There is provided a further roller 26 which is driven by the motor M2. Between the roller 24 of the main loop forming unit R and the roller 23 of the second loop forming unit R2, there are interposed rollers 27, 28 operatively connected with the roller 23 via an unillustrated belt to be driven by the motor M4.

Figure 3:
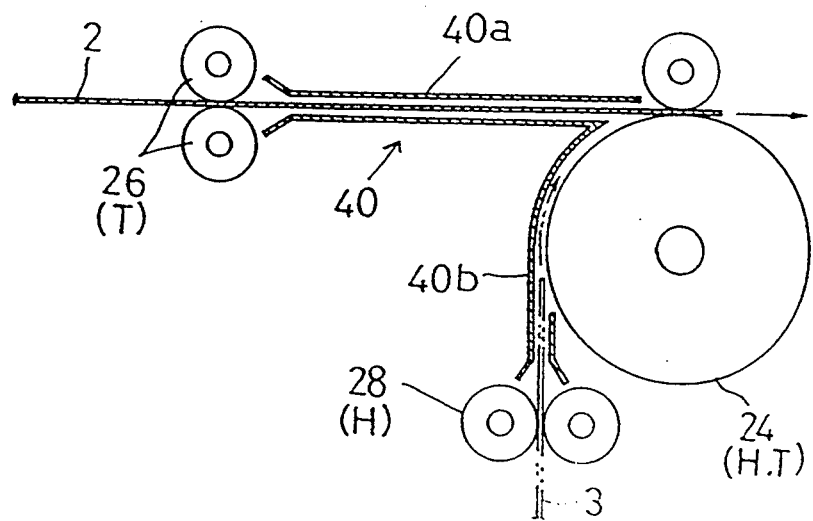
FIG. 3 is a section view showing the major portions of the image printer of FIG. 1.

Between the roller 24 and the rollers 26, 28, in order to allow introduction of both the standard printing paper 2 transported from the first exposure unit F and the sensitivity-shifted printing paper 3 transported from the second exposure unit S into the developing unit D, there is provided a guide member 40 having a forked-cross section, as shown in FIG. 3.

For transporting the standard printing paper 2 into the main loop forming unit R through the first loop forming unit R1, the motor M4 is stopped to stop transportation of the standard printing paper 2. Then, in this condition, the motor M4 is activated to rotate the roller 28 thereby to transport the sensitivity-shifted printing paper 3. With this, the sensitivity-shifted printing paper 3 is transported along a horizontal guiding portion 40b of the guide member 40 to reach the main loop forming unit R.

The developing unit D includes four developing tanks 7 and rollers 41. These rollers 41 are operatively connected with the roller 25 via an unillustrated belt to be driven by the motor M6.

The standard printing paper 2 or the sensitivity-shifted printing paper 3 is transported in the form of a single line by the rollers 41 to be developed through its successive passage through the developing tanks 7 filled with developing liquids.

The controller C is connected to an input unit E functioning as an interface for allowing input of image information from an external device and also to a control panel O for allowing an operator to effect input operations of instructions. Some examples of the external device for transmitting image information to the controller C of the image printer 1 are an image scanner for reading an image, a computer allowing production of computer graphics, and so on.

Figure 4:
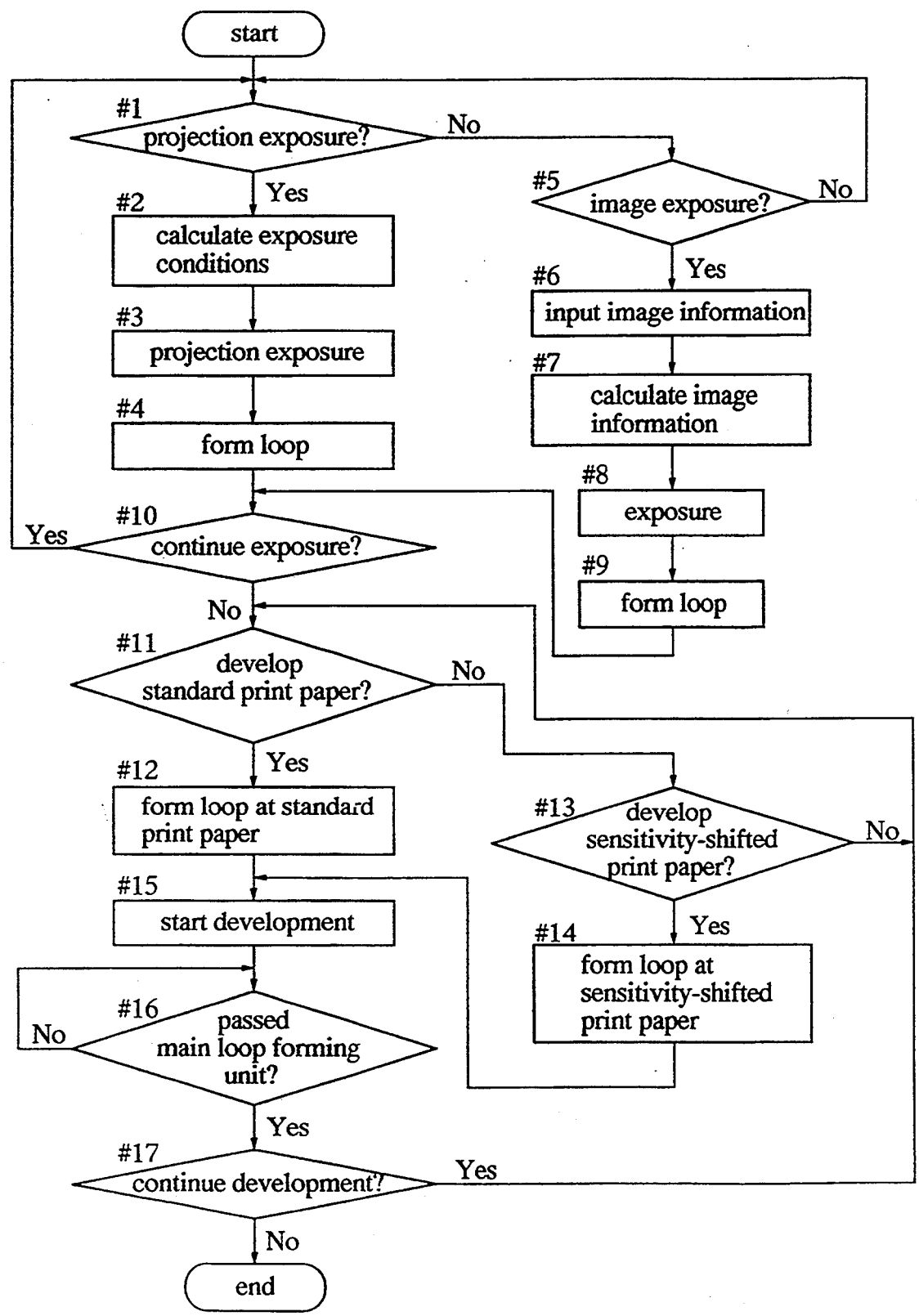
FIG. 4 is a flow chart illustrating functions of the image printer of FIG. 1.

Next, with reference to a flow chart of FIG. 4, the operations of the image printer 1 having the above-described construction will be explained. The control operations of these operations illustrated in this flow chart of FIG. 4 are all executed by the controller C.

First, the process judges whether an instruction inputted from the control panel O comprises an instruction for an exposure operation by the projection exposure unit P or an exposure operation by the image exposure unit I (step #1, step #5). If the inputted instruction is for an exposure by the projection exposure unit P; then, the controller C calculates and determines exposure conditions such as an exposure time period based on such information as density information of each frame of the film 4 (step #2). Based on the obtained exposure conditions, the image of the frame of the film 4 for which projection exposure the instruction has been given is projected and exposed on to the standard printing paper 2 (step #3). As the transportation and projection exposure of the standard printing paper 2 proceeds, a loop is formed at the first loop forming unit R1 (step #4). With completion of the exposure of the instructed portion of the film 4 on to the standard printing paper 2, if an instruction for continuously effecting a further exposure operation is given from the control panel O; then, the process returns to step #1. Incidentally, with the completion of exposure of its instructed portion, a terminal end of this exposed portion of the standard printing paper 2 is cut by means of an unillustrated cutter.

On the other hand, if the instruction inputted from the control panel O comprises an instruction for an exposure by the image exposure unit I; then, at step #5, the process branches to step #6 to input image information to be exposed from the input unit E (step #6). With completion of this input of the image information, the process executes calculations for converting the inputted image information into exposure image information for controlling operations of the first through third exposure heads 30, 31, 32 (step #7). Then, the sensitivity-shifted printing paper 3 is exposed by the first through third exposure heads 30, 31, 32 (step #8).

As this exposure proceeds, a loop of the sensitivity-shifted printing paper 3 is formed at the second loop forming unit R2 (step #9). With completion of the exposure of the instructed portion of the image information, and if there has been given an instruction for continuing an exposure operation (step #10); then, the process returns to step #1. Incidentally, with the completion of exposure of its instructed portion, a terminal end of this exposed portion of the sensitivity-shifted printing paper 3 is cut by means of an unillustrated cutter.

With completion of all exposure operations, the process branches from step #10 to step #11 to enter a developing step of the exposed standard printing paper 2 or sensitivity-shifted printing paper 3.

If it is judged that the instruction from the control panel O is for a development of the standard printing paper 2 (step #11, step #13); then, the motor M2 and the motor M5 are activated to initiate transportation of the standard printing paper 2 which has been accumulated in the form of a loop at the first loop forming unit R1. Then, a loop of the standard printing paper 2 is formed at the main loop forming unit R (step #12).

On the other hand, if it is judged that the instruction from the control panel O comprises an instruction for development of the sensitivity-shifted printing paper 3 (step #11, step #13); then, the motor M4 and the motor M5 are activated to start transportation of the sensitivity-shifted printing paper 3 which has been accumulated in the form of a loop at the second loop forming unit R2. Then, a loop of the sensitivity-shifted printing paper 3 is formed at the main loop forming unit R (step #14).

With the formation of a loop of either the standard printing paper 2 or the sensitivity-shifted printing paper 3, the motor M6 is activated to initiate the developing operation (step #15). This operation is continued until a terminal end of the standard printing paper 2 or of the sensitivity-shifted printing paper 3 has passed through the main loop forming unit R (step #16). With completion of the passage of the standard printing paper 2 or of the sensitivity-shifted printing paper 3 through the main loop forming unit R, the process is ready to start a developing operation of either the standard printing paper 2 or the sensitivity-shifted printing paper 3 to be introduced next. If the instruction from the control panel O indicates continuation of the exposure operation; then, the process returns to step #11 to again execute the above-described operations. Otherwise, the process ends the developing operation.

Accordingly, the rollers 20, 21, 24, 25, 26 and the motors M1, M2, M5, M6 together function as standard transport means T for transporting the standard printing paper 2 through an exposing position to the developing unit D. Further, the rollers 22, 23, 24, 25, 27, 28 and the motors M3, M4, M5, M6 together function as auxiliary transport means H for transporting the sensitivity-shifted printing paper 3 through an exposing position to the developing unit D.

The projection exposure unit P of the first exposure unit F functions as standard exposure means for exposing the standard printing paper 2 at the exposing position of the standard transport means T. The image exposure unit I of the second exposure unit S functions as auxiliary exposure means for exposing the sensitivity-shifted printing paper 3 at the exposing position of the auxiliary transport means H.

Next, some other embodiments of the present invention will be specifically described.

Figure 5:
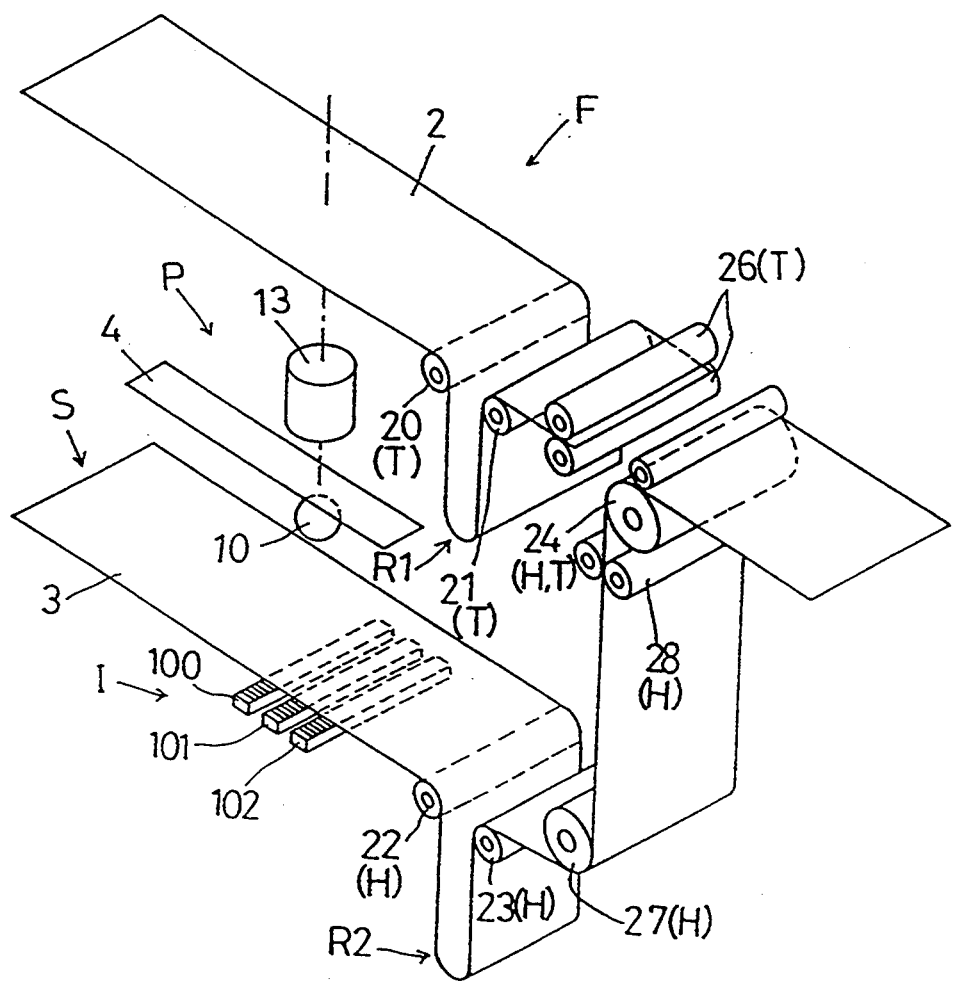
FIG. 5 is a perspective view showing major portions of an image printer according to a further embodiment of the present invention.

(1) In the foregoing embodiment, the semiconductor lasers are employed as the exposure light sources of the image exposure unit I. Instead, as shown in FIG. 5, light emitting diodes may be employed as the exposure light sources.

More specifically, a plurality of green light emitting diodes are linearly arranged in the direction normal to the transporting direction of the sensitivity-shifted printing paper 3, on which there are linearly arranged, one above another, a first LED exposure head 100 including a SELFOC lens array (registered trade mark of Nippon Sheet Glass Co., Ltd.), a plurality of red light emitting diodes, a second LED exposure head 101 including a SELFOC lens array, a plurality of near infrared light emitting diodes and a third exposure head 102 including a SELFOC lens array. Then, the sensitivity-shifted printing paper 3 is adapted to have sensitivity to the wavelengths of the light emitted from the respective light emitting diodes.

In this case of the image exposure unit I using the light emitting diodes as its exposure light sources, the functions of this image exposure unit are the same as those illustrated in the flow chart of FIG. 4.

As the specific kinds of the light emitting diodes, in addition to the above-described three kinds, namely, the green, red and near infrared light emitting diodes, any other kind e.g. orange light emitting diodes may be employed as well.

(2) The foregoing embodiment employs, as the exposure light sources, the three types of the semiconductor lasers having the oscillating wavelengths of 670 nm, 750 nm and 830 nm. Instead, it is possible to employ semiconductor lasers having different oscillating wavelengths, e.g. 630 nm, 780 nm or the like.

(3) In the foregoing embodiments, the semiconductor lasers or the light emitting diodes are employed as the exposure light sources. Instead, it is also conceivable to employ e.g. EL (electroluminescent) elements illuminating orange and green lights, as the exposure light sources.

(4) In the foregoing embodiment, the projection exposure unit P is adapted to effect the exposure of the standard printing paper 2 through a projection-exposure operation. Alternatively, it is conceivable to adapt this means to effect the exposure of the printing paper 2 with dividing image information into a plurality of areas by means of light shutters comprised of a plurality of units of PLZT or liquid crystal shutters.

(5) In the foregoing embodiment, the sensitivity-shifted printing paper 3 is developed in full colors by the combination of the three types of the semiconductor lasers and the characteristics of the sensitivity-shifted printing paper adapted therefor. Instead, this printing paper may be developed in two or more than four colors.

(6) In the foregoing embodiment, at the developing unit D, the standard printing paper 2 or the sensitivity-shifted printing paper 3 is transported in a single line. Instead, with extension of the transporting width of the developing tanks 7 of the developing unit D, the standard printing paper 2 or the sensitivity-shifted printing paper 3 may be transported in two parallel lines.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image printer comprising:
    transport means for transporting photosensitive materials to a developing unit;
    exposure means for exposing the photosensitive materials;
    wherein, said transport means includes standard transport means and auxiliary transport means, said standard transport means being operable to transport to said developing unit said standard photosensitive material having sensitivity to a wavelength range of the three primary color components of light, said auxiliary transport means being operable to transport to said developing unit said auxiliary photosensitive material having sensitivity to a light wavelength range different from that of said standard photosensitive material; and
    wherein, said exposure means includes standard exposure means and auxiliary exposure means, said standard exposure means being operable to expose said standard photosensitive material at an exposing position of said standard transport means, said auxiliary exposure means being operable to expose said auxiliary photosensitive material at an exposing position of said auxiliary transport means.

2. An image printer as claimed in claim 1, wherein, at said developing unit, said standard or auxiliary photosensitive material transported therein is transported in a single line to undergo the developing operation.

3. An image printer as claimed in claim 1, wherein said auxiliary exposure means uses a semiconductor laser as an exposure light source thereof and said auxiliary photosensitive material has sensitivity to a wavelength of light emitted from said semiconductor laser.

4. An image printer as claimed in claim 3, wherein said auxiliary exposure means includes three types of semiconductor lasers for respectively irradiating light beams of three different wavelength ranges.

5. An image printer as claimed in claim 4, wherein said three types of semiconductor lasers of said auxiliary exposure means includes a first exposure head using a semiconductor laser of 670 nm oscillating wavelength as its exposure light source, a second exposure head using a semiconductor laser of 750 nm oscillating wavelength as its exposure light source, and a third exposure head using a semiconductor laser of 830 nm oscillating wavelength as its exposure light source.

6. An image printer as claimed in claim 1, wherein said auxiliary exposure means uses a light emitting diode as an exposure light source thereof and said auxiliary photosensitive material has sensitivity to a wavelength of light emitted from said light emitting diode.

7. An image printer as claimed in claim 6, wherein said auxiliary exposure means includes three types of light emitting diodes for respectively irradiating light beams of three different wavelength ranges.

8. An image printer as claimed in claim 7, wherein said three types of light emitting diode chips comprise green, red and near-infrared light emitting diodes linearly arranged in the direction normal to the transporting direction of said auxiliary photosensitive material, on which LED exposure heads including SELFOC lens arrays are disposed.

9. An image printer as claimed in claim 1, further comprising a first exposure unit for exposing said standard photosensitive material and a second exposure unit for exposing said auxiliary photosensitive material, said first exposure unit and said second exposure unit being disposed in parallel to each other in the vertical direction.

10. An image printer as claimed in claim 9, wherein said standard exposure means is provided to said first exposure unit, said standard exposure means including a white-light light source, a light modulating filter for adjusting color balance of the light irradiated from the white-light light source, a mirror tunnel for uniformly mixing the light passing the light modulating filter, a printing lens for forming an image of a film onto the standard photosensitive material, and a shutter, with all said components of the standard exposure means being disposed on a single optical path; and
    wherein said auxiliary exposure means is provided to said second exposure unit and is operable to expose image information with the information being divided into a plurality of areas.

* * * * *